US008275816B1

United States Patent
Pegg

(10) Patent No.: US 8,275,816 B1
(45) Date of Patent: Sep. 25, 2012

(54) INDEXING MESSAGING EVENTS FOR SEEKING THROUGH DATA STREAMS

(75) Inventor: Nigel Leigh Pegg, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 329 days.

(21) Appl. No.: 12/613,973

(22) Filed: Nov. 6, 2009

(51) Int. Cl.
*G06F 15/16* (2006.01)
*G06F 17/20* (2006.01)

(52) U.S. Cl. .................. 707/829; 707/956; 715/704

(58) Field of Classification Search .............. 707/746, 707/829, 956; 715/704
See application file for complete search history.

(56) References Cited

U.S. PATENT DOCUMENTS

| | | | |
|---|---|---|---|
| 6,693,959 B1 | 2/2004 | Eckart et al. | |
| 6,801,294 B2 | 10/2004 | Jo | |
| 7,221,409 B2 | 5/2007 | Akiyoshi et al. | |
| 7,558,760 B2 | 7/2009 | Fang et al. | |
| 2006/0004862 A1* | 1/2006 | Fisher et al. | 707/104.1 |
| 2008/0168136 A1* | 7/2008 | Choi | 709/204 |
| 2009/0254529 A1* | 10/2009 | Goldentouch | 707/3 |

OTHER PUBLICATIONS

Fung et al, Time-Dependent Event Hierarchy Construction, Published Aug. 2007, pp. 300-309.*
Kim, et al., IFLIX, "is246 Multimedia Metadata Final Project Milestone 5: Complete Description of our iFlix Design" pp. 1-26.

* cited by examiner

*Primary Examiner* — John E Breene
*Assistant Examiner* — Alex Gofman
(74) *Attorney, Agent, or Firm* — Kilpatrick Townsend & Stockton LLP

(57) ABSTRACT

Techniques disclosed herein include systems and methods for indexing data events from a stream of data for seeking through recorded data streams. Techniques disclosed herein can enable a faster and more efficient process by which a processor can seek from one point of time in a data stream to another point of time in that data stream to bring a played-back application to a desired point in time. A playback manager analyzes data events within a series of data events, which are recorded in a linear data structure. The playback manager creates a hierarchical data structure for storing the data events to provide logically grouped storage of data events in addition to the linear data structure. The playback manager stores the data events in the hierarchical data structure based on type of data event and based on timestamps associated with each respective data event. The playback manager then traverses the linear data structure and consolidates data events to produce a hierarchical state representation of the recorded data stream at the given seek point for rendering in a playback application.

16 Claims, 6 Drawing Sheets

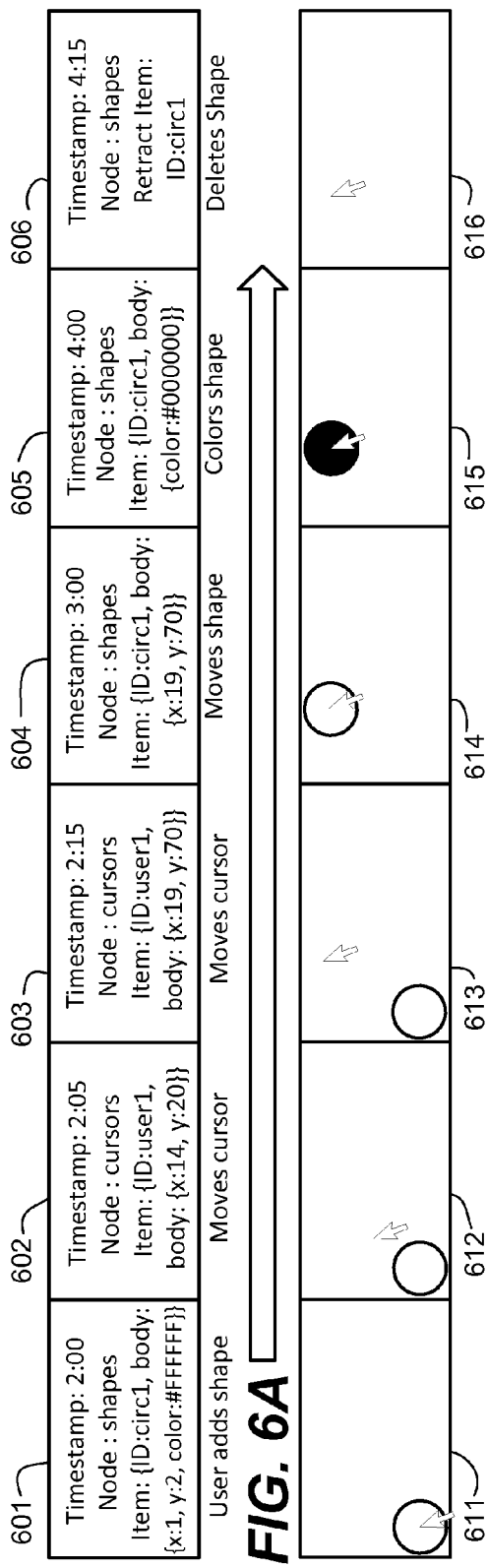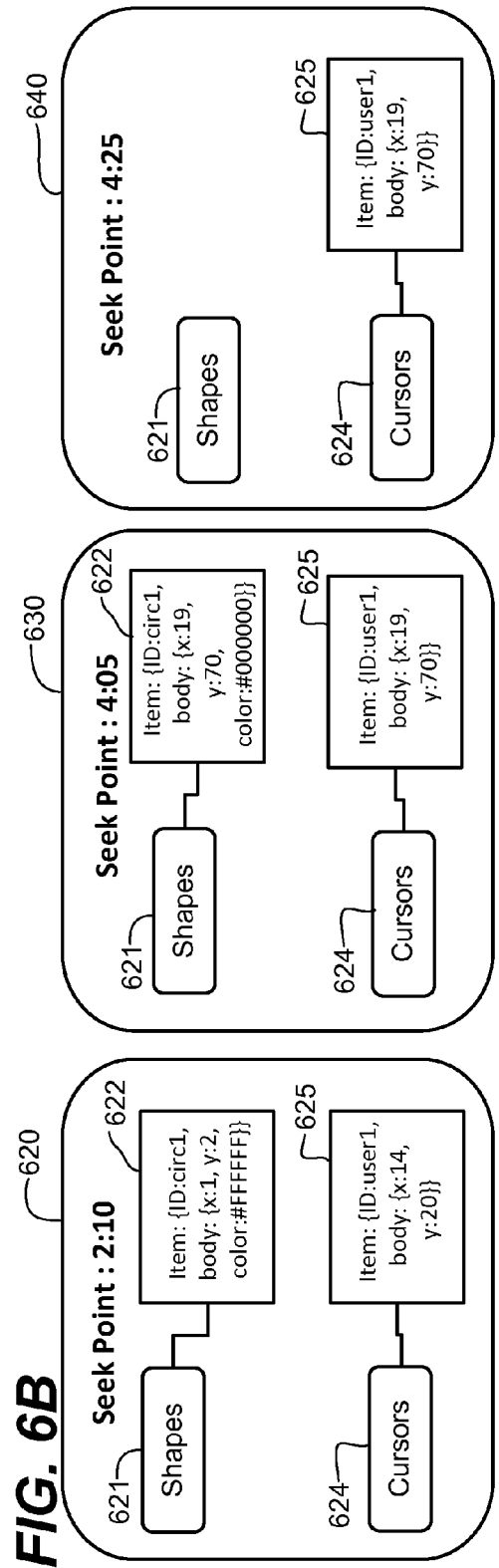

INDEXING MESSAGING EVENTS FOR SEEKING THROUGH DATA STREAMS

BACKGROUND

The present disclosure relates to playback of recorded data streams. Data streams include a sequence of transmitted electronic information. Transmitted information can include video, audio, graphics, text, and so forth. For example, a video camera or webcam can capture and transmit video images across a network. Such a video stream can also include capturing transmitting audio data. Additionally, there are several messaging applications for transmitting various types of data streams. For example electronic text chat clients transmit a stream of text data. There are also web conferencing applications for transmitting submitted notes in real time. Web conferencing applications and other applications can provide a shared drawing space between two or more participants. All of these streams of data can be recorded for subsequent playback.

SUMMARY

Typically, conventional systems for providing playback of a given recorded data stream enable a user to select a seek operation, meaning that a user specifies a specific playback time to seek to, or jump to, within the recorded data stream. Such a seek operation can cause a conventional rendering application to stop playback from a current playback point in time, and then continue playback from a different point in time of the data stream.

There are challenges associated with recording and playing back various types of data streams. For example, data streams that are not raster graphics, or pixel-based graphics, have challenges distinct from, for example, a stream of video data. For a stream of video data, a device that captures video data captures successive still frames that represent a full state of an individual image. Storage of complete image frames at short intervals can consume lots of storage resources. Conventional video codecs can create intermediate frames or delta frames that include only pixel changes in between full frames to conserve storage resources. During playback of a corresponding video stream, a processor can find the nearest full frame at a given point in time to render a complete representation of the state of a scene.

Streams of data that are not pixel-based, however, such as a chat session or drawing space or messaging application, etc., can stream data as a series of individual additions, modifications, deletions, or other instructions. Thus such individual data events might not represent a full state of a corresponding application or data stream. These streams of data can be recorded for time-based playback. During playback of such streams of data, for a given seek point a processor typically must rapidly playback all data events from an initial record point (or current playback point) to the given seek point in order to generate a current state representation of the data stream. In other words, a processor must build up to a current seek point by quickly rendering all corresponding intervening data events in order of time. This processing technique can be intensive, slow, inefficient, and can bog down networks and even cause network or device failures.

Techniques disclosed herein include systems and methods for indexing data events from a stream of data for seeking through recorded data streams. In one embodiment, a playback manager analyzes data events within a series of data events transmitted across a computer network. For example, playback manager can analyze events from a stream of chat messages, a networked word processing application, webcam video data, graphical drawing applications, etc. The data events are recorded in a linear data structure that organizes the data events in an order of time according to timestamps associated with each respective data event. The linear data structure enables time-based playback of the series of data events on a graphical display. For example, when playing back a chat session, a graphical display can render a chronological progression of chat messages or drawing strokes recorded from a transmission because of the linear or flat data structure used to record data events.

The playback manager creates a hierarchical data structure for storing the data events from the series of individual data events. The hierarchical data structure provides storage of the data events in addition to the linear data structure. Thus, the playback manager can provide parallel data storage of data events, with data events being stored both in the linear data structure and in the hierarchical data structure. The hierarchical data structure includes branches and nodes for organizing the data events. Using branches and nodes, the playback manager can provide a data structure for storing data events that is structured logically based on attributes, properties, or metadata of individual data events, while the linear data structure stores data events in sequential order.

The playback manager stores the data events in the hierarchical data structure based on type of data event and based on the timestamps associated with each respective data event. In one example, a type of data event might be a chat entry, or a drawing stroke, or a web cam image, or audio clip, and so forth. Types of data events can further define or categorize data events such as whether the event is a cursor movement, a shape operation, a font operation, etc. Since the series of data events is recorded and/or transmitted via one or more computer devices, the playback manager can collect individual data events based on timestamps, and determine a position in the hierarchy based on metadata stored with those events (such as branch name, node name, item ID, etc.). Each respective data event that is stored in the hierarchical data structure indicates a position of the respective data event within the hierarchical data structure and a data operation associated with the respective data event. For example, a given data event can indicate a particular branch (or branches) and node as a storage position. Data operations associated with the respective data event can be relative to other data events and/or relative to the hierarchical data structure. For example, data operations can include instructions for modifying previously transmitted data events such as modifications or deletions or additions to existing data. As a more specific example, such data operations might instruct modifications such as adding a paragraph of text, deleting a shape, italicizing certain words, etc.

In another embodiment, for a given seek point in a recorded data stream of the series of individual data events, the playback manager traverses the linear data structure (time-based structure) to build or produce a hierarchical state representation of the recorded data stream at the given seek point for rendering in a playback application, the hierarchical state representation consolidating data events. A seek point can be any scrub point, scan point or jump point, meaning any indicated point in time of the recorded data events to begin or continue playback. Because the playback manager stores data events in the linear structure by timestamp and also includes type, data operation, branch, node, and item IDs, from which to build a hierarchical state representation, the playback manager is able to consolidate data events using the branches and nodes. Consolidating can include collapsing, occluding, and accumulating branches, nodes, and items to generate a hierarchical representation of the data stream at the given seek point. Thus, the state representation is a consolidated state of data events that occur in the recorded data stream prior to the given seek point.

Yet other embodiments herein include software programs to perform the steps and operations summarized above and disclosed in detail below. One such embodiment comprises a computer program product that has a computer-storage medium (e.g., a tangible computer readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: analyzing data events within a series of individual data events transmitted across a computer network, the data events being recorded in a linear data structure that organizes the data events in an order of time according to timestamps associated with each respective data event, the linear data structure enabling time-based playback of the series of data events on a graphical display; creating a hierarchical data structure for storing the data events from the series of individual data events, the hierarchical data structure providing storage of the data events in addition to the linear data structure; and storing the data events in the hierarchical data structure based on type of data event and based on the timestamps associated with each respective data event, each respective data event that is stored in the hierarchical data structure indicates a position of the respective data event within the hierarchical data structure and a data operation associated with the respective data event. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting data streams and web conferencing applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 6A is a diagram illustrating a representation of a series of individual data events according to embodiments herein.

FIG. 6B is a diagram illustrating a representation of results of several seek operations according to embodiments herein.

DETAILED DESCRIPTION

Figure 1:
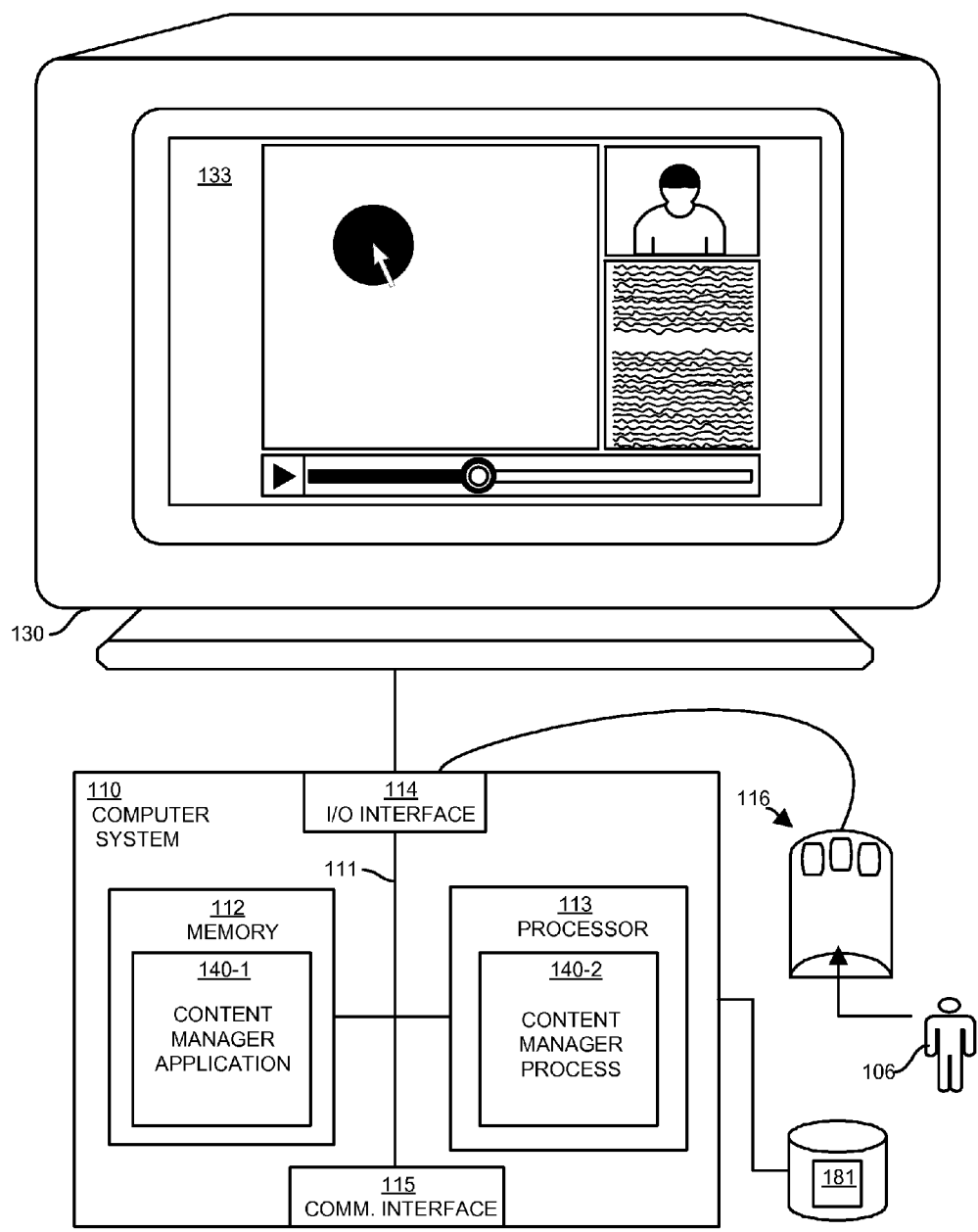
FIG. 1 is an example block diagram of a playback manager operating in a computer/network environment according to embodiments herein.

Techniques disclosed herein include systems and methods for indexing data events from a stream of data for seeking through recorded data streams. Techniques disclosed herein can enable a faster and more efficient process by which a processor can seek from one point of time in a data stream to another point of time in that data stream to bring a played-back application to a desired point in time.

According to one example embodiment, a playback manager can consolidate a full state of a data stream, at a given selected seek point, as a current state representation of that data stream at that seek point.

Conventionally, when playing back a recorded data stream, data events typically arrive to a client in the format in which the data events were recorded. For example, if a given data stream being recorded was a chat session of message data transmitted between two or more interfaces, then as chat messages are recorded, each message is recorded as a discrete event in a data stream. As a recording of this example chat session is played back, recorded data events are sent to a rendering or playback application up to a corresponding chronological time.

A challenge with such a conventional playback of a data stream is that when seeking, that is jumping discretely from one point in time of the data stream to another point in time in playback of the data stream, systems typically requires that multiple events are played back near-instantaneously in order to bring the recorded data stream up to a state corresponding to a seek point. By way of a more specific and non-limiting example, continuing with the chat session example, a given chat session might progress with 500 chat messages transmitted in the first 60 minutes of recording, then those 500 chat messages are cleared or deleted at minute 62, and then five more chat messages are transmitted subsequent to deleting the 500 messages. This example data stream is recorded over time meaning that it will contain the 500 message events, then a clear event, and then five more messages. If, during playback of this example chat session, a particular user inputs a seek point for playback to begin/continue at minute 62, then a rendering application must playback all 500 messages, then clear those 500 messages, then add five subsequent messages (a total of 506 events in the data stream). Quickly rendering all of these data events to complete a seek operation can be inefficient and slow because only the last five data events need to be rendered in order to accurately represent a state of the data stream at minute 62. Such processing is inefficient in part because a rendering application operating at the application layer of a network (top layer) typically needs to render all of the intervening data events. Such processing is also inefficient in that all 506 events might need to be transmitted to the rendering application over a computer network, for example, leading to unnecessary congestion of transmitted network data.

In one embodiment, the playback manager provides an intermediary filtering layer, such as at the network or server or service level, to playback operation of a rendering application. A rendering application can operate at the client computer level, or end user device, and provide an interface for inputting data events and playing recorded data events. The playback manager reads data streams, such as various types of data streams transmitted between two clients, and interprets these data events. Based on this interpretation or analysis, playback manager can consolidate a series or sequence of data events into a minimal set of data events required to bring a recorded data stream to its final state at a seek point.

The playback manager can alternatively operate at the client level or at the server level. In one embodiment, the playback manager can function as a filter between a raw data stream and a rendering application interface itself. Accordingly, in response to receiving a request of a seek operation, playback manager can scan data events in one or more given streams (up to a seek point) and consolidate affected or corresponding data events into a final state representation. The playback manager can then deliver this final state representation to a rendering application for playback. After this delivery of the accumulated or consolidated state representation, the rendering application can continue playback by processing sequentially stored data events in the data stream from the requested seek point. In other words, after receiving the consolidated state representation to render, the rendering application can resume receiving and rendering individually transmitted data events from data events stored in a linear data structure.

The playback manager can also provide a data structure for data events recorded in a given data stream to be related to a hierarchical data structure (tree-based data structure) that represents a holistic state of a completed data stream. Thus, the playback manager can store data events from a given data stream in a data structure of branches and nodes as a complete data stream. In such a data structure, each data event describes its position in the structure, and the type of operation (creation, modification, or deletion of that part of the structure).

In one example embodiment and continuing with the chat session example, each chat message can be represented as a "leaf" on a particular branch of a hierarchical data structure for a given data stream of chat messages. A function of each branch is to store chat messages or other data events. Each chat message event recorded specifies a branch to which a data event belongs (such as the chat message branch), and describes a type of operation, such as creation of a new leaf on that branch.

Continuing with the previous example chat being cleared at minute 60 in the recording, a data event recorded at minute 60 is a deletion event for the entire chat message branch and a recreation of that branch. The subsequent 5 messages are then new leaf creation events. By applying the hierarchical data structure, the playback manager can filter data events to complete the seek operation to minute 62 by quickly building a hierarchical representation of the events encountered up until that seek point. With such hierarchical building, branches and leaves can be created, edited, and destroyed. By operating playback manager as a filtering layer below a rendering application, the rendering application does not need to react until the playback manager completes this filtering operation. In the chat example, 500 leaves are added to a branch, then the branch is cleared by an event, and then five subsequent leaves are added to that branch, which comprises the resultant data structure. At this point, playback manager transmits this consolidated set of events to the rendering application. The rendering application then only needs to render these last five data events, rather than rendering 506 data events. This consolidation results in a significant performance gain when performing seek operations.

Now more particularly, FIG. 1 shows a general overview of the playback manager and how it can be tied to an example physical apparatus, such as a computer and related components. After this description of FIG. 1 appears a more detailed description of processes and methods executed by the playback manager itself. This subsequent description will explain the flow charts and will reference diagrams in the Figures to describe example embodiments.

In FIG. 1, computer system 110 is shown connected to display monitor 130 for displaying a graphical user interface 133 for a user 106 to use a playback manager 140 for playback operations from data streams, using input devices 116. Repository 181 can be used for recording data streams and/or data structures both before and after processing. Input devices 116 can include one or more devices such as a keyboard, computer mouse, etc.

Note that the following discussion provides a basic embodiment indicating how to carry out functionality associated with the playback manager 140 as discussed above and below. It should be noted, however, that the actual configuration for carrying out the playback manager 140 can vary depending on a respective application. For example, as previously discussed, computer system 110 can include one or multiple computers that carry out the processing as described herein.

In different embodiments, computer system 110 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, 110 interface 114, and a communications interface 115.

I/O interface 114 provides connectivity to peripheral devices such as input devices 116 including a computer mouse, a keyboard, a selection tool to move a cursor, display screen, etc.

Communications interface 115 enables the playback manager 140 of computer system 110 to communicate over a network and, if necessary, retrieve any data required to create views, process content, communicate with a user, etc. according to embodiments herein.

As shown, memory system 112 is encoded with playback manager 140-1 that supports functionality as discussed above and as discussed further below. Playback manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the playback manager 140-1. Execution of the playback manager 140-1 produces processing functionality in playback manager process 140-2. In other words, the playback manager process 140-2 represents one or more portions of the playback manager 140 performing within or upon the processor 113 in the computer system 110.

It should be noted that, in addition to the playback manager process 140-2 that carries out method operations as discussed herein, other embodiments herein include the playback manager 140-1 itself (i.e., the un-executed or non-performing logic instructions and/or data). The playback manager 140-1 may be stored on a tangible computer readable storage medium including computer readable storage media such as floppy disk, hard disk, optical medium, etc. According to other embodiments, the playback manager 140-1 can also be stored in a memory type system such as in firmware, read only memory (ROM), or, as in this example, as executable code within the memory system 1012.

In addition to these embodiments, it should also be noted that other embodiments herein include the execution of the playback manager 140-1 in processor 113 as the playback manager process 140-2. Thus, those skilled in the art will understand that the computer system 110 can include other processes and/or software and hardware components, such as an operating system that controls allocation and use of hardware resources, or multiple processors.

Functionality supported by computer system 110 and, more particularly, functionality associated with playback manager 140 will now be discussed via flowcharts and diagrams in FIG. 2 through FIG. 6. For purposes of the following discussion, the playback manager 140 or other appropriate entity performs steps in the flowcharts.

Figure 2:
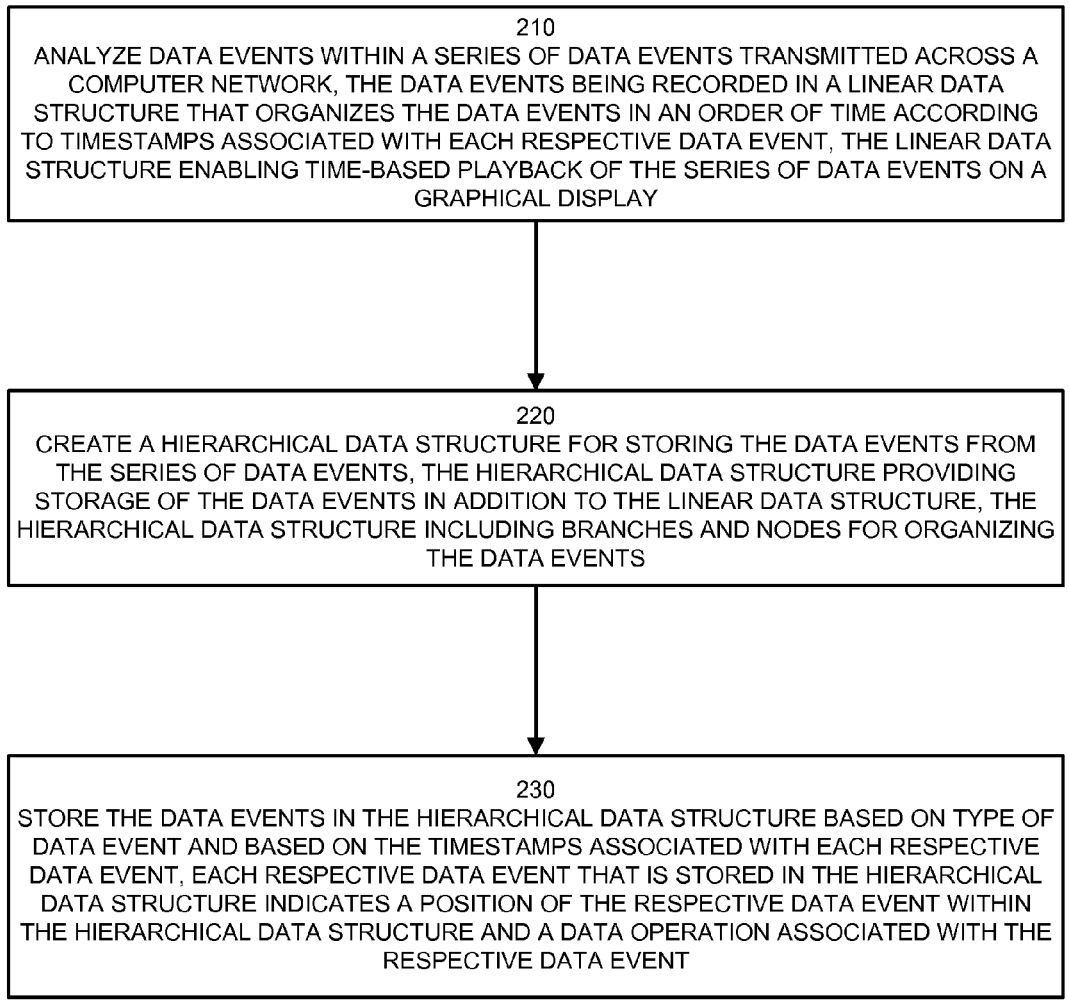
FIG. 2 is a flowchart illustrating an example of a process supporting a playback manager of a data stream according to embodiments herein.

Now describing embodiments more specifically, FIG. 2 is a flow chart illustrating embodiments disclosed herein.

In step 210, playback manager 140 analyzes data events within or from a series of data events transmitted across a computer network. The data events can be any sequence of discrete events. For example, such data events can be captured from a text or drawing interface, or from a webcam or audio transmission. Data events are individual in that each data event can be instructions or a component piece of data from a data stream. By way of a non-limiting example, some Internet applications or web conferencing tools include a collaborative drawing application or electronic "white board." Such a drawing application can enable multiple users to view a same drawing display on separate or distinct interfaces. One or more of the drawing interfaces can provide functionality for receiving drawing inputs such as shapes, lines, strokes, text, formatting changes, and so forth. Receiving drawing inputs can then be transmitted as received for simultaneous rendering on each separate display. Such a drawing application enables participants to be part of a drawing progression over time instead of receiving a final drawing. In this example embodiment, to display a progression of drawing input, a series of data events are transmitted across a network to update each display at about a same time.

The data events can be recorded in a linear data structure that organizes the data events in an order of time according to timestamps associated with each respective data event. This linear data structure enables time-based playback of the series of data events on a graphical display. Continuing with the example embodiment of a drawing application, the linear data structure can record a progression of drawing strokes and input as a function of time, and store this in sequential order to be able to playback a corresponding data stream in a chronological order of progression. Timestamps, or another indicator of time can be associated with each data event as it is transmitted across a network or between/among participating drawing interfaces.

In step 220, playback manager 140 creates a hierarchical data structure for storing the data events from the series of data events. The hierarchical data structure provides storage of the data events in addition to the linear data structure. Thus, playback manager 140 provides parallel data storage of data events. The hierarchical data structure can separately store a copy of each data event, or can store data events at a same location as the linear data structure. Such a branching and nodal structure enables storing a series of data events by attributes or other properties in addition to (or separate from) a chronological sequence of data events. The hierarchical data structure can be data-agnostic by storing multiple different types of data in a hierarchical structure.

In step 230, playback manager 140 stores the data events in the hierarchical data structure based on type of data event and based on the timestamps associated with each respective data event. Each respective data event that is stored in the hierarchical data structure indicates a position of the respective data event within the hierarchical data structure and a data operation associated with the respective data event.

Figure 5:
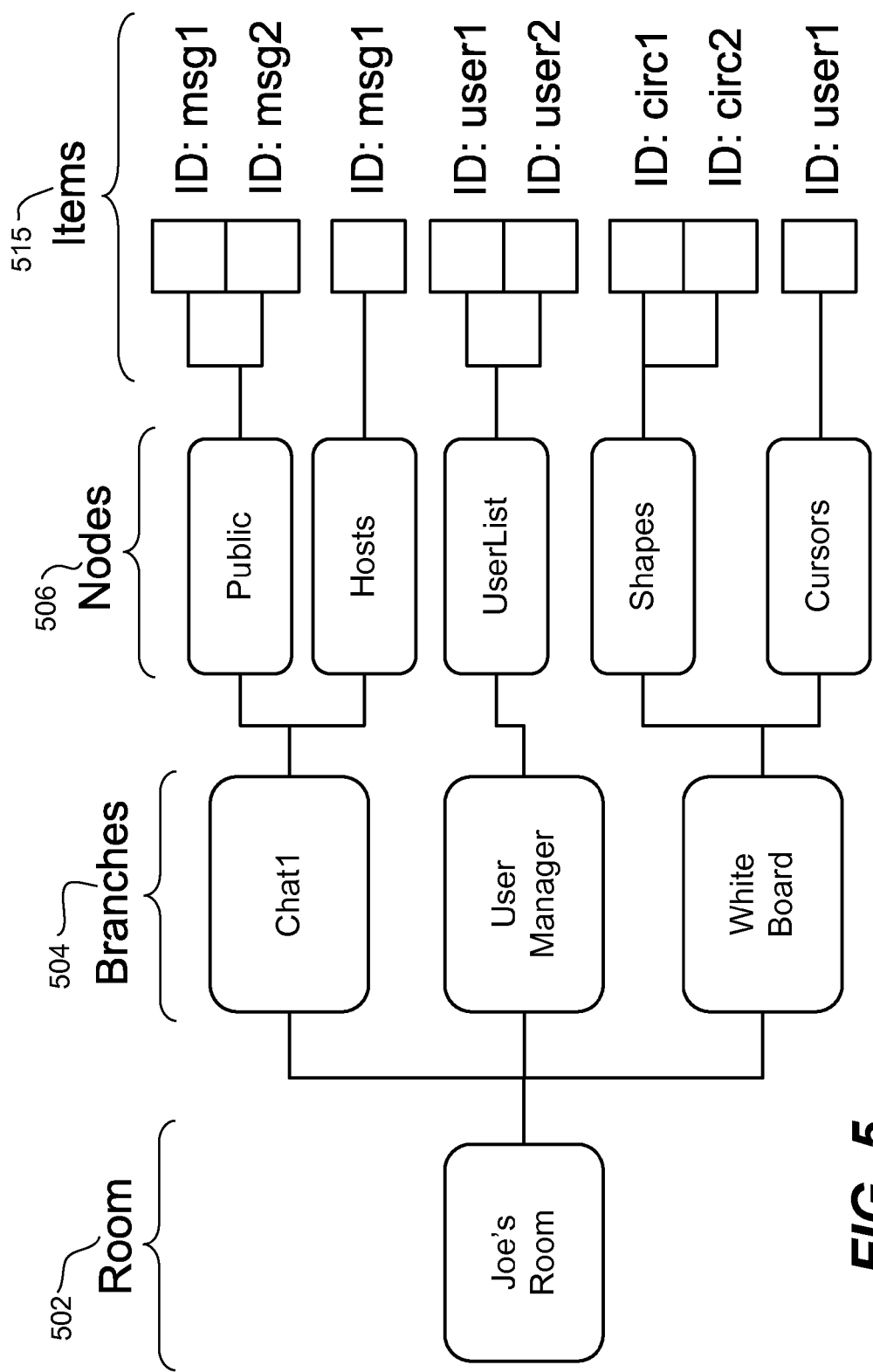
FIG. 5 is a diagram that represents a conceptual illustration of a hierarchical data structure according to embodiments herein.

Playback manager 140 can classify data events into types based on multiple different levels. For example, FIG. 5 illustrates a conceptualization of an example messaging document object model or hierarchical data structure. Individual data events are stored as items 515 within nodes 506. Nodes 506 can branch from branches 504. Branches 504 are part of room 502, which can be, for example, a particular messaging session. Layers of branches and nodes can function as channels or destinations through which message items are sent and received. Branches and nodes can specify a hierarchical location of message items.

Note that room 502 includes a chat application, a user manager (navigation), and a white board (drawing application). Example participants in room 502 can input in any of branches 504. A given participant might draw some figures on the white board, such as a potential sports game plan diagram, and then input text via a chat window for a discussion with other participants of the example game plan diagram. Participants might enter and depart from room 502, and a corresponding participant list can be displayed and updated within the user manager.

Continuing with example room 502, for a chat message data event, such as a line of text, playback manager 140 can store this text in branch "Chat1" with chat data being a type of data event. Likewise, a stroke on the white board can be identified as a drawing type of data to be stored in branch "White Board." Nodes 506 can also represent data types. For example, within the White Board branch there are two nodes: Shapes and Cursor. When analyzing data events, playback manager 140 can identify a given example data event as cursor movement, and store corresponding cursor movement data for this data event as an item within the cursor node.

Thus, playback manager 140 can use these layers to group message items by topic. In one example embodiment, a branch can optionally be used to exclusively send and receive items pertaining to a give chat. For situations of multiple simultaneous chats or messaging interfaces existing in a same collaborative room, each chat would send and receive items encapsulated in its own branch. Nodes can then further subdivide this hierarchy and enable a major branch to have several subtopics or sub-branches.

Within each node, individual messages or data items can be stored as items or discrete events. In one embodiment, playback manager 140 stores items in a hash table or similar data structure, and may be referenced by individual identifications for insertion, modification, or retraction from a parent node. Each of these items can function as an atomic unit of data messaging. For example, one chat message, or one shape entry in a white board, can be represented by an item. Thus, instead of, or in addition to, sending video graphics (pixel arrays) across a network, data events can correspond to individual changes or deltas to a given data stream. While a video aperture captures a complete visual representation of a frame at specific intervals, a vector-based drawing program might not capture a complete representation to transmit, but might transmit individual drawing strokes or input as received, which may not be received at regular time intervals. Likewise with chat messages, a given chat client typically only sends a few lines or characters at a time instead of transmitting an entire chat history at regular intervals.

Recording of a data stream can be automatic or toggled by an operator. During recording, messaging traffic to a server is recorded in terms of time stamped message streams. Such a recording saves each item sent, modified, or retracted within a particular branch, to a flat, linear structure indexed by timestamp. Note that each data event can be recorded with metadata pertaining to the branch, node, and item ID of a given operation performed. This metadata enables reconstruction of the hierarchical representation of the state from the linear stream. Playback manager 140 can then access messaging events up until a given seek point, build a hierarchical data structure, and collapse that set of messaging events in to a final product of their operations, before passing this product to an application layer of a client computer for rendering. The client computer thereby can receive accumulated data events to render, rather than receiving a sequence of individual messages at the application layer to quickly render, since many data events may occlude each other or cancel out each other.

As playback manager 140 analyzes a stream of data events, playback manager 140 can create, modify, and delete branches and nodes. For a given data stream that has a start time and a completion time, playback manager 140 produces a hierarchical data structure storing corresponding data events in the hierarchical data structure to provide complete storage of data events and operations within the given data stream.

Figure 3:
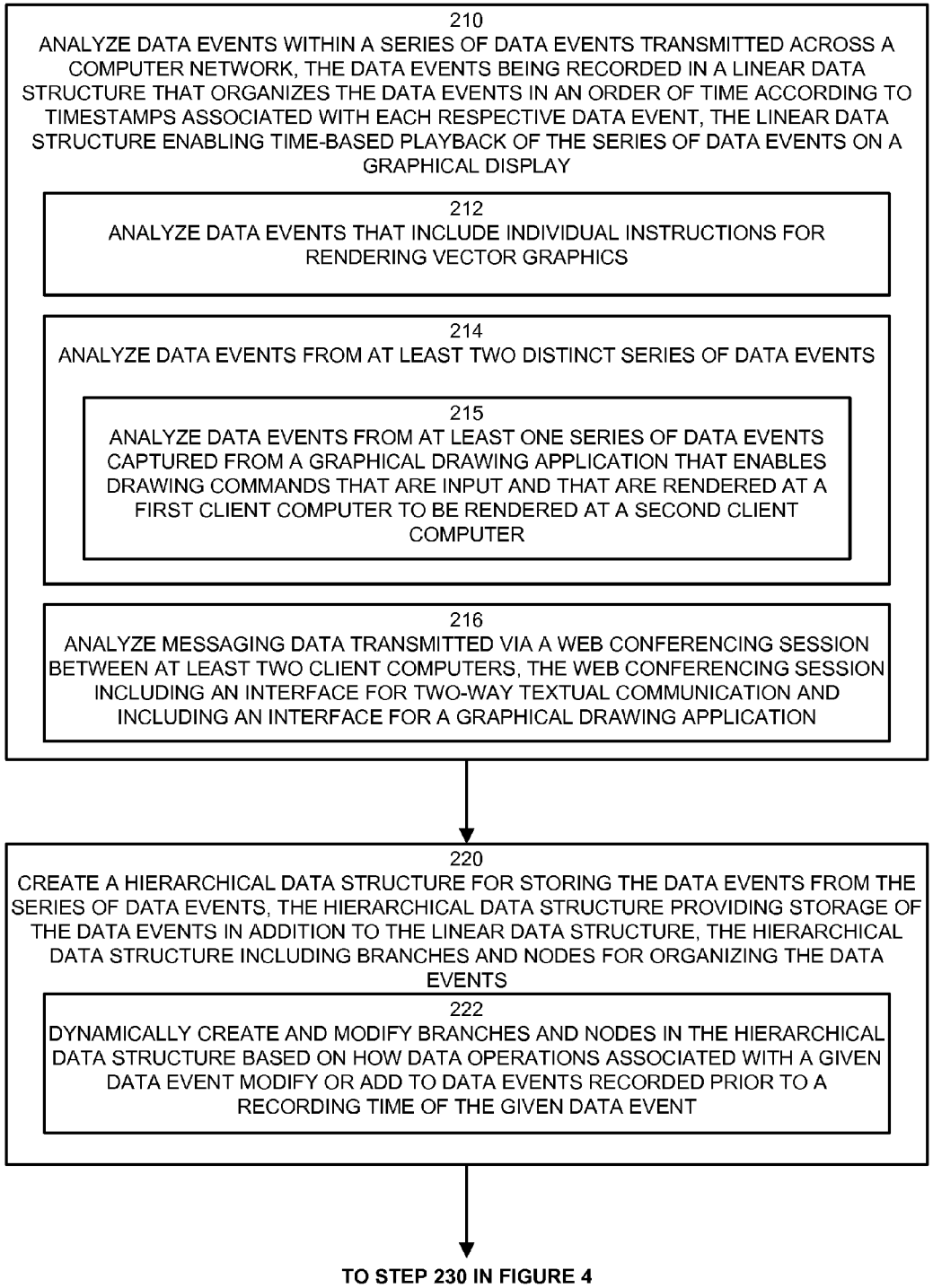
FIGS. 3-4 are a flowchart illustrating an example of a process supporting a playback manager of a data stream according to embodiments herein.
Figure 4:
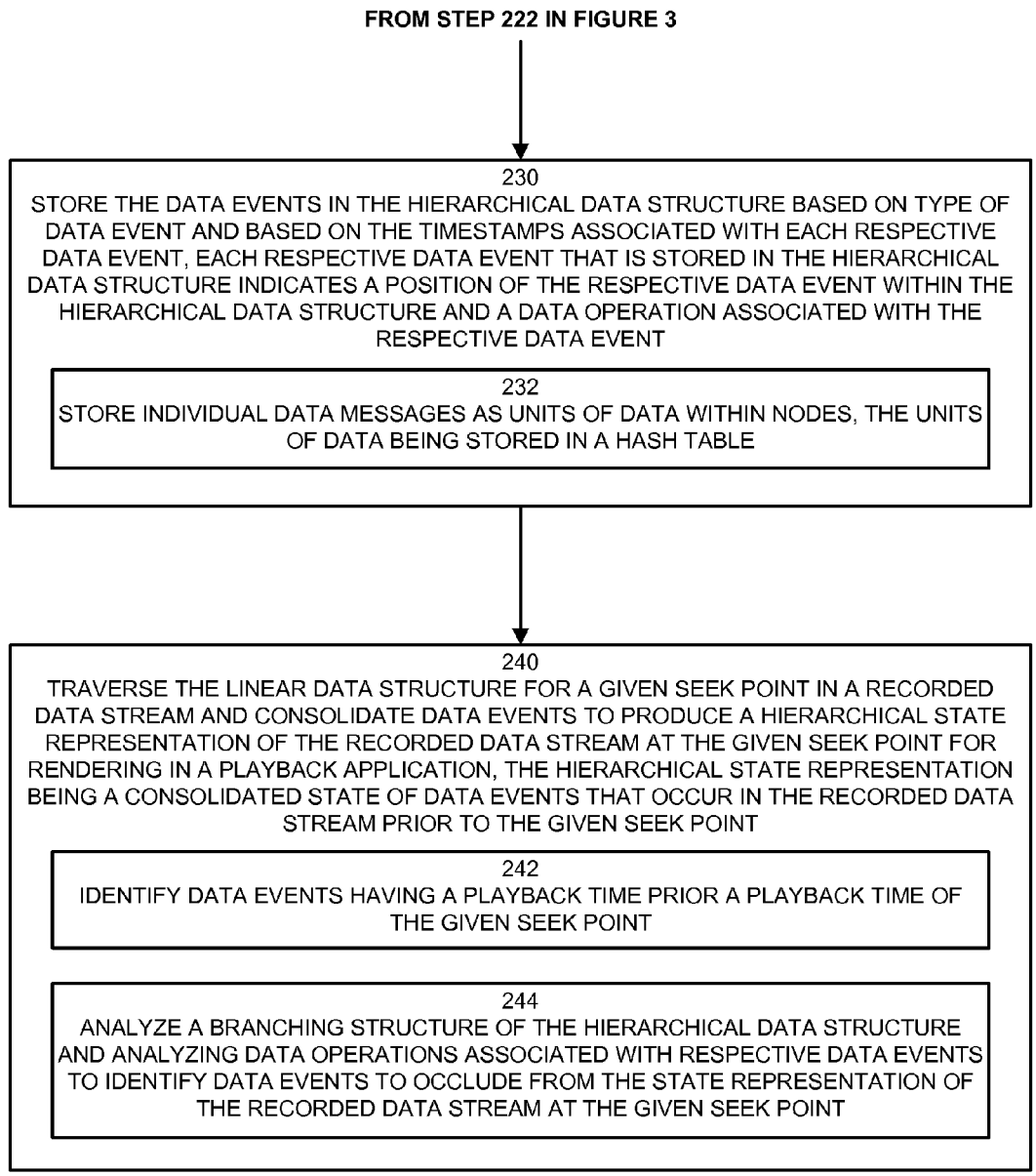

Another embodiment of the playback manager process appears in the flow chart of FIGS. 3-4. This embodiment expands on embodiments in FIG. 2 with additional alternative features.

In step 210, playback manager 140 analyzes data events within a series of data events transmitted across a computer network. Analyzing data events for properties, attributes, and other data operations enables playback manager 140 to quickly file data events into the hierarchical data structure. The data events can be recorded in a linear data structure that organizes the data events in an order of time according to timestamps associated with each respective data event. This linear data structure enables time-based playback of the series of data events on a graphical display.

In step 212, playback manager analyzes data events that include individual instructions for rendering vector graphics. Vector graphics include mathematical drawing instructions. Both text and shapes can be rendered using vector or geometric drawing instructions. Most graphical displays function by using either vector graphics or raster graphics (bitmaps or pixel arrays). Video data, especially video data captured from real life as opposed to computer-generated graphics, is typically captured as raster graphics.

In step 214, playback manager 140 analyzes data events from at least two distinct series of data events. By way of a non-limiting example, two distinct series of data events can include two different chat messaging sessions, or a web conferencing session having different interfaces for different types of communication.

In step 215, playback manager 140 analyzes at least one series of data events captured from a graphical drawing application that enables drawing commands that are input and that are rendered at a first client computer to be rendered at a second client computer. For example a networked drawing interface enables at least two client computers to view drawing events. More specifically, in one example embodiment, playback manager 140 manages a medical rendering application where two doctors can look at x-rays simultaneously and can gesture to places on a displayed x-ray back and forth from separate locations.

In step 216, playback manager 140 analyzes messaging data transmitted via a web conferencing session between at least two client computers. The web conferencing session can include an interface for two-way textual communication and can include an interface for a graphical drawing application. For example, a messaging application enables participants to transmit messages to each other using a note pad or chat window while also providing one or more additional interfaces for messaging such as a white board.

In step 220, playback manager 140 creates a hierarchical data structure for storing the data events from the series of data events. The hierarchical data structure provides storage of the data events in addition to the linear data structure. The hierarchical data structure includes branches and nodes for organizing the data events.

In step 222, playback manager 140 dynamically creates and modifies branches and nodes in the hierarchical data structure based on how data operations associated with a given data event modify or add to data events recorded prior to a recording time of the given data event. For example, if a given data operation in a drawing program is an instruction to delete several shapes, then any record of the deleted shapes is removed from that branch to be able to easily collapse the hierarchical data structure to occlude those deleted shapes for seek times beyond or after the deletion operation.

In step 230, playback manager 140 stores the data events in the hierarchical data structure based on type of data event and based on the timestamps associated with each respective data event. Each respective data event that is stored in the hierarchical data structure indicates a position of the respective data event within the hierarchical data structure and a data operation associated with the respective data event.

In step 232, playback manager 140 stores individual data messages as units of data within nodes, the units of data being stored in a hash table.

In step 240, for a given seek point in a recorded data stream of the series of individual data events, playback manager 140 traverses the linear data structure and consolidates data events to produce a hierarchical state representation of the recorded data stream at the given seek point for rendering in a playback application. The state representation is a consolidated state of data events that occur in the recorded data stream prior to the given seek point. Thus, when playback manager 140 receives a command to jump to a specific point in a data stream, the playback manager 140 can analyze the metadata contained in the linear stream of events to construct the hierarchical data structure, using a seek time, to generate a hierarchical representation of a state of the data stream at the seek time.

In step 242, playback manager 140 identifies data events having a playback time prior a playback time of the given seek point. As part of the hierarchical data structure analysis, playback manager 140 can locate data events relevant to a seek point.

In step 244, playback manager 140 analyzes a branching structure of the hierarchical data structure and analyzes data operations associated with respective data events to identify data events to occlude from the state representation of the recorded data stream at the given seek point. As a given data stream progress, some data events transmitted or accumulated in the data stream can be deleted or modified. Playback manager 140 can identify such deleted or modified data events, using the hierarchical data structure, and occlude these data events so that a rendering application does not need to graphically process these data events.

FIG. 6A is an illustration of a progression of data events within a series of data events that define the linear data structure. Data events 601-606 represent a progression of data events showing example data that can be included in an individual data event. In this example embodiment, the data events correspond to a drawing application, such as a white board application. Frames 611-616 illustrate example graphics on a display screen with drawing strokes and movement progressing in time from frame 611 to frame 616, or from left to right in the illustration. Note that frames 611 through 616 in general show movement of a cursor and creation, modification and deletion of a circle. Data captured from frame 611 corresponds to a data event 601. Data event 601 includes a timestamp of 2:00, a node type of shapes, and drawing instructions.

Specifically, for data event 611, a user adds a shape to a drawing display. In this example, the shape is a circle colored white and located at the bottom left of the frame. Data event 602 occurs at time 2:05 and indicates that the cursor was moved up and to the right, as shown in frame 612. Data event 603 occurs at time 2:15 and indicates an additional cursor movement as depicted in frame 613. Data event 604 occurs at time 3:00 and indicates that that the circle was moved up and to the right, relative to frame 614. Data event 605 occurs at time 4:00 and indicates that the circle changed color from white to black, as indicated in frame 615. Data event 606 occurs at time 4:15 and indicates that the circle has been deleted, as shown in frame 616.

Note that data events do not necessarily occur at regular intervals of time. While playback manager 140 can record data events at regular time intervals, when embodied for analyzing messaging data, corresponding data events may not be regularly inputted.

FIG. 6B is a diagram illustrating representations of data stream states at various seek points. The example seek points include state representation 620 at seek point 2:10, state representation 630 at seek point 4:05, and state representation 640 at seek point 4:25. Each of state representations 620, 630, and 640 include data for shape node 621 and cursor node 625. Item 622 represents consolidated data operations for shape node 621 at various seek points. Likewise, item 625 represents data operations or rendering instructions for cursor node 624 at various seek points.

State representation 620 consolidates data from data events 601 and 602, and includes instructions for a rendering application to render shapes and cursors. In this example, the instructions include rendering a circle colored white at one specific coordinate location, and rendering a cursor at another location. State representation 630 consolidates data from data events 601 through 605, and includes instructions for rendering the circle at a different location and to color the circle black. State representation 640 includes no rendering instructions for drawing the circle because this circle was deleted prior to seek point 4:25.

Playback manager 140 can operate with various embodiments and applications. For example, in one embodiment, playback manager 140 functions with a collaboration service having several modules for users to share and collaborate with other users via voice over IP, web camera feeds, chat messaging, graphical drawing applications, note or word processing modules, and so forth. Users can subscribe to any combination of modules for either one-sided viewing or interactive exchange of data, and can record periods or sequences of data exchange progression.

For conferencing or messaging embodiments, a collaboration service or collaboration server can be used for managing data transmissions, recording data streams, and buffering transmissions. Traversing hierarchical data structures at the server level can increase efficiency by reducing an amount of data to transmit to client computers for rendering. For data stream transmissions that are not recorded until after a specific amount of time, data events occurring before a point of recording can be accumulated into a consolidated data event. In response to seek operations for a time in a data stream before a record point, playback manager 140 can return that consolidated data event. In another embodiment, playback manager 140 can automatically consolidate data events at predetermined intervals to create a series of consolidated data events. In this embodiment, a collaboration service can immediately access a nearest complete state representation for a given seek point.

Those skilled in the art will understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method comprising:
analyzing one or more of a plurality of data events transmitted across a computer network to determine a respective event type describing a data input generating each respective data event, the analyzed data events being recorded in a linear data structure that organizes the analyzed data events in an order of time according to timestamps associated with each respective data event, the linear data structure enabling time-based playback of the plurality of data events on a graphical display;

creating a hierarchical data structure for storing the analyzed data events from the plurality of data events, the hierarchical data structure providing storage of the analyzed data events in addition to the linear data structure, wherein the hierarchical data structure is based on a respective timestamp associated with each respective data event and a respective event type of each respective data event;

storing the analyzed data events in the hierarchical data structure, each respective data event that is stored in the hierarchical data structure indicating a position of the respective data event within the hierarchical data structure and a data operation associated with the respective data event;

identifying data events having a playback time prior to a playback time of a given seek point in a recorded data stream of the plurality of data events; and analyzing a branching structure of the hierarchical data structure and analyzing data operations associated with respective data events to identify data events to occlude from a hierarchical state representation of the recorded data stream at the given seek point, wherein the hierarchical state representation comprises a consolidated state of data events that occur in the recorded data stream prior to the given seek point.

2. The computer-implemented method of claim 1, wherein creating the hierarchical data structure for storing the analyzed data events from the plurality of data events includes dynamically creating and modifying branches and nodes in the hierarchical data structure based on how data operations associated with a given data event modify or add to data events recorded prior to a recording time of the given data event.

3. The computer-implemented method of claim 1, wherein storing the analyzed data events in the hierarchical data structure includes storing individual data messages as units of data within nodes, the units of data being stored in a hash table.

4. The computer-implemented method of claim 1, wherein analyzing the one or more data events from the plurality of data events transmitted across a computer network includes analyzing data events that include individual instructions for rendering vector graphics.

5. The computer-implemented method of claim 4, wherein analyzing the one or more events from the plurality of data events includes analyzing data events from at least two distinct series of data events.

6. The computer-implemented method of claim 5, wherein analyzing data events from at least two distinct series of data events includes analyzing at least one series of data events captured from a graphical drawing application that enables drawing commands that are input and that are rendered at a first client computer to be rendered at a second client computer.

7. The computer-implemented method of claim 4, wherein analyzing the one or more events from the plurality of data events includes analyzing messaging data transmitted via a web conferencing session between at least two client computers, the web conferencing session including an interface for two-way textual communication and including an interface for a graphical drawing application.

8. The method of claim 1, wherein the event type describes the data input as at least one of a text input, a drawing input, an image recording, or an audio recording.

9. A non-transitory computer-readable medium having instructions stored thereon for processing data information, such that the instructions, when carried out by a processing device, cause the processing device to perform the operations of:

analyzing one or more of a plurality of data events transmitted across a computer network to determine a respective event type describing a data input generating each respective data event, the analyzed data events being recorded in a linear data structure that organizes the analyzed data events in an order of time according to timestamps associated with each respective data event, the linear data structure enabling time-based playback of the plurality of data events on a graphical display;

creating a hierarchical data structure for storing the analyzed data events from the plurality of data events, the hierarchical data structure providing storage of the analyzed data events in addition to the linear data structure, wherein the hierarchical data structure is based on a respective timestamp associated with each respective data event and a respective event type of each respective data event;

storing the analyzed data events in the hierarchical data structure, each respective data event that is stored in the hierarchical data structure indicating a position of the respective data event within the hierarchical data structure and a data operation associated with the respective data event;

identifying data events having a playback time prior to a playback time of a given seek point in a recorded data stream of the plurality of data events; and analyzing a branching structure of the hierarchical data structure and analyzing data operations associated with respective data events to identify data events to occlude from a hierarchical state representation of the recorded data stream at the given seek point, wherein the hierarchical state representation comprises a consolidated state of data events that occur in the recorded data stream prior to the given seek point.

10. The computer-readable medium of claim 9, wherein creating the hierarchical data structure for storing the analyzed data events from the plurality of data events includes dynamically creating and modifying branches and nodes in the hierarchical data structure based on how data operations associated with a given data event modify or add to data events recorded prior to a recording time of the given data event.

11. The computer-readable medium of claim 9, wherein storing the analyzed data events in the hierarchical data structure based on type of data event and based on the timestamps associated with each respective data event includes storing individual data messages as units of data within nodes, the units of data being stored in a hash table.

12. The computer-readable medium of claim 9, wherein analyzing the one or more data events from the plurality of data events transmitted across a computer network includes analyzing data events that include individual instructions for rendering vector graphics.

13. The computer-readable medium of claim 12, wherein analyzing the one or more events from the plurality of data events includes analyzing data events from at least two distinct plurality of data events.

14. The computer-readable medium of claim 13, wherein analyzing data events from at least two distinct series of data events includes analyzing at least one series of data events captured from a graphical drawing application that enables drawing commands that are input and that are rendered at a first client computer to be rendered at a second client computer.

15. The computer-readable medium of claim 12, wherein analyzing the one or more events from the plurality of data events includes analyzing messaging data transmitted via a web conferencing session between at least two client computers, the web conferencing session including an interface for two-way textual communication and including an interface for a graphical drawing application.

16. A computer system comprising:
  a processor;
  a memory unit that stores instructions associated with an application executed by the processor; and
  an interconnect coupling the processor and the memory unit, wherein the processor is configured to access the memory and to execute the instructions to perform operations of:
    analyzing one or more of a plurality of data events transmitted across a computer network to determine a respective event type describing a data input generating each respective data event, the analyzed data events being recorded in a linear data structure that organizes the analyzed data events in an order of time according to timestamps associated with each respective data event, the linear data structure enabling time-based playback of the plurality of data events on a graphical display;
    creating a hierarchical data structure for storing the analyzed data events from the plurality of data events, the hierarchical data structure providing storage of the analyzed data events in addition to the linear data structure, wherein the hierarchical data structure is based on a respective timestamp associated with each respective data event and a respective event type of each respective data event;
    storing the analyzed data events in the hierarchical data structure, each respective data event that is stored in the hierarchical data structure indicating a position of the respective data event within the hierarchical data structure and a data operation associated with the respective data event;
    identifying data events having a playback time prior to a playback time of a given seek point in a recorded data stream of the plurality of data events; and
    analyzing a branching structure of the hierarchical data structure and analyzing data operations associated with respective data events to identify data events to occlude from a hierarchical state representation of the recorded data stream at the given seek point, wherein the hierarchical state representation comprises a consolidated state of data events that occur in the recorded data stream prior to the given seek point.

\* \* \* \* \*